United States Patent
Ko et al.

(10) Patent No.: US 8,840,302 B2
(45) Date of Patent: Sep. 23, 2014

(54) COMPOSITE MATERIAL FOR A TEMPERATURE SENSOR, AND A METHOD OF MANUFACTURING A TEMPERATURE SENSOR USING THE SAME

(75) Inventors: Na Yun Ko, Seoul (KR); Tae Seung Lee, Gyeonggi-do (KR); Jin Seong Park, Gwangju (KR)

(73) Assignees: Hyundai Motor Company, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 182 days.

(21) Appl. No.: 13/469,466

(22) Filed: May 11, 2012

(65) Prior Publication Data
US 2013/0208764 A1    Aug. 15, 2013

(30) Foreign Application Priority Data
Feb. 9, 2012    (KR) .......................... 10-2012-0013469

(51) Int. Cl.
*G01K 7/00*    (2006.01)
*G01K 7/22*    (2006.01)
*C04B 35/01*    (2006.01)

(52) U.S. Cl.
CPC ................. *G01K 7/22* (2013.01); *C04B 35/016* (2013.01); *C04B 35/01* (2013.01)
USPC .......................................... 374/185; 252/500

(58) Field of Classification Search
None
See application file for complete search history.

(56) References Cited

U.S. PATENT DOCUMENTS

| | | | |
|---|---|---|---|
| 5,246,628 A | | 9/1993 | Jung et al. |
| 7,656,269 B2 * | | 2/2010 | Mizoguchi et al. ......... 338/22 R |
| 2002/0084884 A1 * | | 7/2002 | Takahashi et al. .............. 338/25 |
| 2002/0135455 A1 * | | 9/2002 | Murata et al. ................... 338/28 |
| 2003/0205698 A1 | | 11/2003 | Ogata et al. |
| 2005/0265426 A1 * | | 12/2005 | Hanzawa et al. ............. 374/208 |
| 2006/0013282 A1 * | | 1/2006 | Hanzawa et al. ............. 374/163 |
| 2007/0188295 A1 * | | 8/2007 | Mizoguchi et al. ......... 338/22 R |
| 2009/0016409 A1 * | | 1/2009 | Mizoguchi et al. ........... 374/185 |

FOREIGN PATENT DOCUMENTS

| | | |
|---|---|---|
| CN | 101046416 A | 10/2007 |
| JP | 2005150289 A | 6/2005 |
| KR | 10-2011-0105232 | 9/2011 |

* cited by examiner

*Primary Examiner* — Andre Allen
(74) *Attorney, Agent, or Firm* — Edwards Wildman Palmer LLP; Peter F. Corless

(57) ABSTRACT

A composite material for a temperature sensor and a method of manufacturing the temperature sensor using the composite material are provided. The composite material contains four or more kinds of metal oxides combined with highly insulating materials to produce a material with semiconductor-like properties to more accurately measure a temperature at high temperature in the range of 500° C. and above. The sensor includes electrode wires having a predetermined diameter inserted into the metal oxide of the temperature sensor when the metal oxide is press-molded to form the temperature sensor. Through the connection of the electrode wires to the temperature sensor device, disconnection of the electrode wires from the device even at a high temperature.

15 Claims, 5 Drawing Sheets

COMPOSITE MATERIAL FOR A TEMPERATURE SENSOR, AND A METHOD OF MANUFACTURING A TEMPERATURE SENSOR USING THE SAME

CROSS-REFERENCE TO RELATED APPLICATION

This application claims under 35 U.S.C. §119(a) the benefit of Korean Patent Application No. 10-2012-0013469 filed on Feb. 9, 2012, the entire contents of which are incorporated herein by reference.

BACKGROUND (a) Technical Field

The present invention relates to a composite for a temperature sensor, and a method of manufacturing the same.

(b) Background Art

As the number of vehicles being used around the world has increased, the consumption of fossil fuels such as gasoline, diesel, kerosene, liquid natural gas (LNG), and liquid propane gas (LPG) has also increased. At the same time the limited supply of these fossil fuels has been gradually depleted, the price of oil has sharply risen. Thus, there is a need to improve the fuel efficiency of vehicles.

Also, as a result of the accumulation of greenhouse gases, the environmental standards applied to the regulation of exhaust gas have been tightened; consequently, various apparatuses for reducing vehicle emissions that arise during the combustion of a fossil fuel are required.

In particular, the environmental regulations that control the release of dust, NOx, etc., that result from the combustion of diesel fuel have been highly tightened. Thus, there is a need for a post-exhaust apparatus for the re-combustion of such environmental pollutants/gas, or the conversion of such gas into a non-harmful/non-polluting gas.

This type of post-exhaust apparatus shows optimum efficiency when operated at the proper temperature. Consequently, such an apparatus requires a high precision/high durability temperature sensor.

In other words, the temperature sensor of such a post-exhaust apparatus for vehicles can be used at a high temperature of, for example, 500° C. or more. Furthermore, such a temperature sensor must be able to withstand frequent, extreme variations in temperature that may range from room temperature or below, to an operating temperature of 500° C. or above. Additionally, such a temperature sensor must be able to withstand the high vibration that results from the normal operation of a vehicle.

Temperature sensors are typically made of a metal or a metal oxide. If the temperature sensor is to be used at a high temperature, then a metal oxide temperature sensor is generally used. To manufacture a metal oxide temperature sensor according to the conventional art, a test piece of a transition metal oxide such as $Fe_2O_3$—$NiO$—$Cr_2O_3$—$MnO_2$ is initially manufactured by a ceramic process of mixing, calcining, and sintering. After the test piece is manufactured, an electrode is printed or plated on the test piece surface. Then, an electrode wire (lead wire) made of Ni, Pt, Au, Cu, or the like, is bonded on the electrode so as to manufacture the temperature sensor. Disadvantageously, the use of transition metals alone to manufacture such a metal oxide temperature sensor, results in a sensor that cannot accurately measure a resistance at temperatures of 500° C. or more because the resistance is very low (e.g., about several ohms (Ω)). Thus, there is a significant problem with this type of temperature sensor in high temperature applications because the measurement error is large.

Additionally, since the manufacturing process involves printing the test piece surface with an electrode made of Ag, Au, Pt, or the like, which is then attached with an electrode wire or pin, the electrode wire or pin is a connection point that is sensitive to temperature and vibration. For example, the electrode may become detached from the device surface under conditions of high temperature and/or high vibration, as is typically found during the operation of a vehicle. Accordingly, another disadvantage of this type of sensor is that it is prone to failure with normal vehicle use, and subject to frequent replacement. Accordingly, there is a need for a temperature sensor that provides accurate readings at high operating temperatures, and is durable under the high temperature and high vibration conditions that are normally associated with operation of a vehicle.

SUMMARY OF THE DISCLOSURE

The present invention provides a composite material for a temperature sensor, and a method of manufacturing a temperature sensor using the same. The temperature sensor may include 4 or more kinds of metal oxides that are added with highly insulating materials, which enable the temperature sensor to accurately measure temperature even at high temperatures of 500° C. or more. Furthermore, unlike a conventional art temperature sensor in which an electrode is printed or plated on the device surface, electrode wires with a predetermined diameter are inserted into the metal oxides of the temperature sensor of the present invention during press-molding of the metal oxides for the temperature sensor. Through this connection of the electrode wires to the temperature sensor device, electrode wires are prevented from becoming disconnected from the temperature sensor even when used in a high temperature and/or high vibration operating environment.

In one aspect, the present invention provides a composite material for a temperature sensor, including metal oxides with a chemical formula of $Mn_\alpha Fe_\beta Ni_\gamma Cr_\delta Y_\epsilon Al_\phi$, wherein α represents 0.1 to 0.4 mole, β represents 0.1 to 0.3 mole, γ represents 0.1 to 0.5 mole, δ represents 0.01 to 0.05 mole, ε represents 0.1 to 0.5 mole, and Φ represents 0.01 to 0.2 mole.

The temperature sensor includes electrode wires inserted into a device of metal oxides, wherein the metal oxides may have a chemical formula of $Mn_\alpha Fe_\beta Ni_\gamma Cr_\delta Y_\epsilon Al_\phi$ (herein, α represents 0.1-0.4 mole, β represents 0.1-0.3 mole, γ represents 0.1-0.5 mole, δ represents 0.01-0.05 mole, ε represents 0.1-0.5 mole, and Φ represents 0.01-0.2 mole).

In another aspect, the present invention provides a method of manufacturing a temperature sensor, the method including the steps of: mixing metal oxides with a chemical formula of $Mn_\alpha Fe_\beta Ni_\gamma Cr_\delta Y_\epsilon Al_\phi$ (herein, α represents 0.1-0.4 mole, β represents 0.1-0.3 mole, γ represents 0.1-0.5 mole, δ represents 0.01-0.05 mole, ε represents 0.1-0.5 mole, and Φ represents 0.01-0.2 mole); calcining the mixed metal oxides; inserting electrode wires into the calcined metal oxides, and press-molding the metal oxides; and performing heat treatment on the molded metal oxides.

According to the present invention, the composite material for a temperature sensor, and a method of manufacturing the temperature sensor using the same, have the following advantageous.

First, the composite material for the temperature sensor is obtained by mixing a predetermined amount of yttria and alumina with a transition metal, which makes it possible to more easily control the resistance of the temperature sensor according to a temperature change; accordingly, the composite material and method of the invention allow a stability and a proper resistance range of a sensor resistance value to be obtained, even at high temperature. Also, the resistance value can be adjusted to be several MΩ at room temperature, and several tens of Ω at temperature range of about 500° C. to about 600° C. Thus, there is an advantage in that it is possible to easily measure a temperature change of a post-exhaust apparatus even at a high temperature.

Second, electrode wires with a predetermined diameter are inserted into a metal oxide body, which is then subjected to heat treatment at high temperature. Thus, the molded metal oxide body is sintered while the electrode wires are in tight contact with the molded metal oxide body and therefore tightly fixed by the molded metal oxide body. This significantly improves the durability of the temperature sensor device so that the temperature sensor device has both vibration and shock resistance. Also, this improves the reliability of the measured temperature value.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
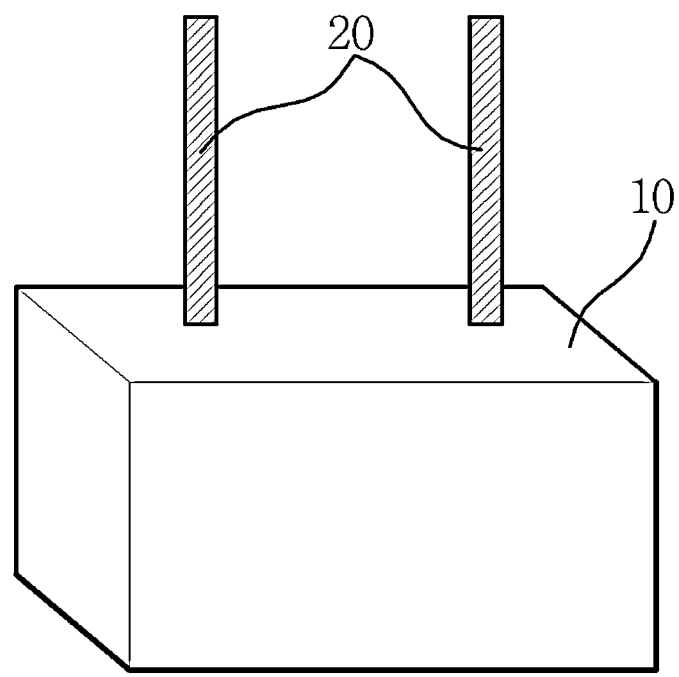
FIG. 1 is an outer perspective view illustrating a metal oxide body into which electrode wires are inserted, according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Hereinafter, an exemplary embodiment of the present invention will be described in more detail with reference to the accompanying drawings so that the person skilled in the art of the present invention can easily implement the technological concept of the present invention.

The present invention relates to a composite material for a temperature sensor with excellent vibration resistance and shock resistance characteristics, and a method of manufacturing the temperature sensor manufactured using the same. According to one aspect of the invention, the temperature sensor can easily and accurately measure a temperature even at a high temperature range, while preventing the electrode wires 20 (see, e.g., FIG. 1) from becoming disconnected from the temperature sensor even at high temperature. According to an exemplary embodiment, the temperature sensor is, for example, designed to measure a vehicle exhaust gas temperature within a post-exhaust apparatus.

The inventive temperature sensor has a semiconductor-like characteristic (hereinafter, referred to as semiconductivity); in that it passes current but has a resistance component; and the resistance level increases and decreases according to a temperature. Accordingly, since the resistance level of the temperature sensor varies according to the temperature change of, for example, an exhaust gas, the temperature sensor measures the temperature of the exhaust gas as a function of the resistance level.

The composite material for the temperature sensor may include four or more kinds of metal oxides, which may be obtained by performing calcination and subsequent heat treatment on transition metals such as manganese (Mn), iron (Fe), nickel (Ni), and/or chromium (Cr) According to another exemplary embodiment, the metal oxides may also be obtained by mixing transition metal oxides such as manganese oxide ($MnO_2$), iron oxide ($Fe_2O_3$), nickel oxide (NiO), and/or chromium oxide ($Cr_2O_3$).

In the mixed composition of the metal oxides, that is, $Mn_\alpha Fe_\beta Ni_\gamma Cr_\delta$, $\alpha$ represents 0.1-0.4 mole, $\beta$ represents 0.1-0.3 mole, $\gamma$ represents 0.1-0.5 mole, and $\delta$ represents 0.01-0.05 mole.

According to an exemplary embodiment of the invention, the four kinds of metallic compounds are added in combination with yttria ($Y_2O_3$) and alumina ($Al_2O_3$), wherein yttria ($Y_2O_3$) and alumina ($Al_2O_3$) are highly insulating due to their stability and high resistance at high temperatures. This reduces the semiconductivity of the transition metals while increasing their resistance level according to a temperature change. Accordingly, it is possible to easily measure the resistance value, thereby reducing measurement error.

For example, at room temperature, when a temperature measurement is carried out, a resistance level sensed by the temperature sensor is about several $M\Omega$. On the other hand, at a high temperature, when a temperature measurement is carried out, the resistance level sensed by the temperature sensor is about several tens of $\Omega$.

In the mixed composition of the metal oxides combined with yttria and alumina, that is $Mn_\alpha Fe_\beta Ni_\gamma Cr_\delta Y_\epsilon Al_\phi$ in an exemplary embodiment, $\alpha$ represents 0.1-0.4 mole, $\beta$ represents 0.1-0.3 mole, $\gamma$ represents 0.1-0.5 mole, and $\delta$ represents 0.01-0.05 mole, $\epsilon$ represents 0.1-0.5 mole, and $\Phi$ represents 0.01-0.2 mole. Even at 500° C. or more, a temperature sensor made of the above described composite material can precisely measure a temperature by detecting a temperature resistance of about several tens of $\Omega$.

Hereinafter, an exemplary manufacturing method of the temperature sensor will be described.

A Mn precursor, a Fe precursor, a Ni precursor, a Cr precursor, a Y precursor, and an Al precursor, for example, $MnO_2$, $Fe_2O_3$, NiO, $Cr_2O_3$, $Y_2O_3$, $Al_2O_3$, are mixed with each other and quantified in such a manner that the composite material for the temperature sensor may have a composition of $Mn_\alpha Fe_\beta Ni_\gamma Cr_\delta Y_\epsilon Al_\phi$, and a composition ratio of $\alpha$: represents 0.1-0.4 mole, $\beta$: represents 0.1-0.3 mole, $\gamma$: represents 0.1-0.5 mole, and $\delta$: represents 0.01-0.05 mole, $\epsilon$: represents 0.1-0.5 mole, and $\Phi$: represents 0.01-0.2 mole.

In the above described composite material for the temperature sensor, in order to more easily adjust the resistance, the composition of transition metals or the amount of additives ($Y_2O_3$, $Al_2O_3$) may be adjusted.

Also, in order to uniformly mix the transition metals and the insulating materials ($Y_2O_3$, $Al_2O_3$), and to mold (or sinter) the composite material into a final shape, calcination is may be used prior to a molding step. Accordingly, the quantified metal oxide reagents may be wet-mixed, and then calcined in the air at about 1000° C. to 1400° C. for about 0.5 to 5 hours.

Calcination indicates that a certain material is heated and its volatile component is removed by high temperature and then it is made into ashes. One of the most generally used calcination methods is a coarsening method. In other words, a powder particle size that is too fine to be filled (formed) is increased so as to increase the fillability of the powder particle. In general, through coarsening, weak bonds between adjacent particles are formed. Thus, in a post-process such as a molding step, the material may be used as large particles.

Figure 2:
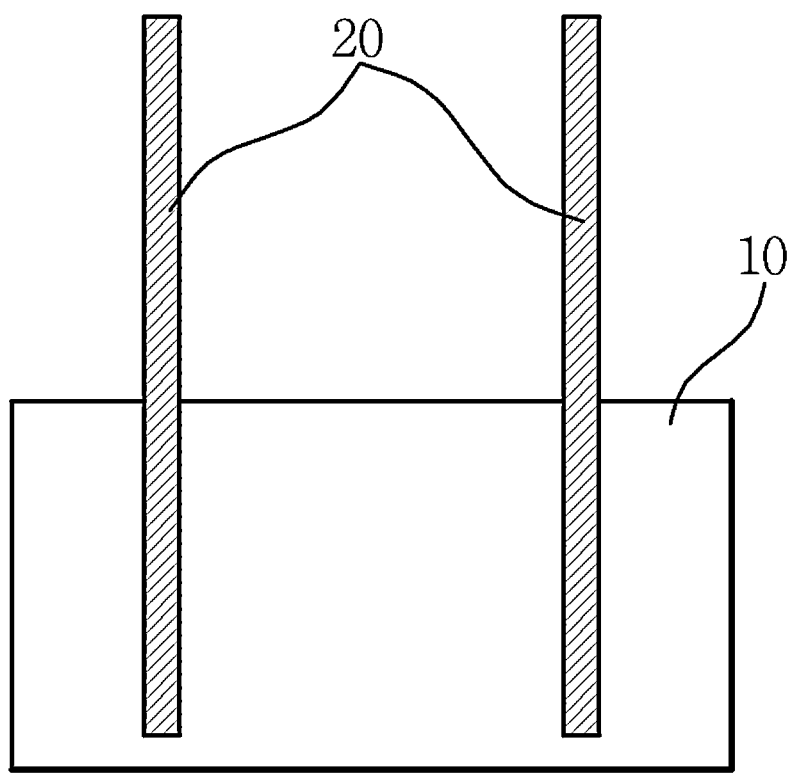
FIG. 2 is a sectional view illustrating the inside of FIG. 1.

FIG. 1 is an outer perspective view illustrating a metal oxide body 10 into which electrode wires 20 are inserted, according to an embodiment of the present invention; and FIG. 2 is a cross-sectional view illustrating the inside of FIG. 1. Then, the calcined powder is pulverized, and then press-molded into a metal oxide body 10 with a hexahedron structure. In the press-molding step, two Pt—Rd electrode wires 20 may be symmetrically inserted, with an interval therebetween, into the molded test piece. According to an exemplary embodiment of the invention, the interval between the electrode wires 20 is set to be as far apart as possible. However, when the interval between the electrode wires 20 is too large, the intervals from the electrode wires 20 to the surfaces of the metal oxide body 10 are narrowed, thereby reducing the fixing power. Accordingly, the electrode wires 20 are preferably set apart from the metal oxide surfaces to some extent so that the electrode wires 20 can be sufficiently fixed.

According to an exemplary embodiment of the present invention, the molded test piece of the metal oxide body 10 perpendicular to the longitudinal direction of the electrode wires 20 may have a size of 2.2 mm, the electrode wires 20 may have a diameter of 0.3 mm, the interval between the electrodes may be 0.6 mm, and the distance from the electrode wires 20 to both sides of the metal oxide body 10 may be 0.5 mm.

As shown in FIGS. 1 and 2, the electrode wires 20 may be inserted between the electrode wires 20 into the metal oxide body 10 in parallel to one another with a predetermined interval, and may have an insertion depth that is proximate to the bottom of the metal oxide body 10 penetrate the bottom. If the electrode wires 20 completely penetrate the metal oxide body 10, the following problems may occur.

For example, when a device including the metal oxide body 10 having the electrode wires 20 inserted thereinto is used in a post-exhaust apparatus, the device has to be inserted into a metal tube. In such an application, if the electrode wires 20 of the metal oxide body 10 are connected to the metal tube, the temperature sensor device may not operate correctly. As another example, if the electrode wires 20 penetrate the metal oxide body 10 during the manufacturing process, the connection between the electrode wires 20 and the metal tube may be prevented by an additional coating step or the formation of an additional surface insulating film.

In order to adjust the resistance of the temperature sensor, the interval of the electrode wires 20 may be adjusted, or the amount of the transition metals and insulating materials may be adjusted. However, for easier resistance adjustment, the adjustment of the interval of the electrode wires 20 is limited. Thus, it is preferable to adjust the amount of transition metals or insulating materials ($Y_2O_3$, $Al_2O_3$).

The metal oxide body 10 having the above described structure is contracted by about 10% through a physicochemical effect in the sintering (molding) step, while the inserted electrode wires 20 are compressed within the metal oxide body 10. Then, the metal oxide body 10 and the electrode wires 20 are electrically connected to each other, forming an ohmic contact therebetween.

As described above, in an exemplary case where the metal oxide body 10 into which the electrode wires 20 are inserted is molded by pressure, when the pressure is added in a direction perpendicular to the electrode wires 20, the electrode wires 20 may be deformed due to powder filling distribution and pressure non-uniformity. Thus, in an exemplary embodiment, it is preferable to add the pressure in a direction parallel to the insertion direction of the electrode wires 20.

In a preferred embodiment of the invention, electrode wires 20 may be made of pure Pt. More preferably, Pt may be added with about 10 to 15 wt % of Rh so as to improve the mechanical strength.

Then, the press-molded metal oxide body 10 into which the electrode wires 20 are inserted may be subjected to heat treatment in the air at about 1300° C. to 1500° C. for about 0.5 to 5 hours so that the metal oxide body 10 can be subjected to a physicochemical reaction, and can be in tight contact with the electrode wires 20.

One of skill in the art will appreciate that the composition ratio, the test piece size, the material and diameter of the electrode wires 20, and the temperature and time of the heat treatment may be variously applied as required for a particular application.

EXAMPLES

The following examples illustrate exemplary embodiments of the invention and are not intended to limit the same.

According to an exemplary embodiment of the present invention, $MnO_2$, $Fe_2O_3$, $NiO$, $Cr_2O_3$, $Y_2O_3$, and $Al_2O_3$ were mixed with each other and quantified in such a manner that the composite can have a composition and a composition ratio of $Y_{0.2}Al_{0.1}Mn_{0.27}Fe_{0.16}Ni_{0.27}O_{1.5\pm x}$, wherein x is $0.0 \leq x \leq 0.1$, and $Y_{0.2}Al_{0.1}Mn_{0.264}Fe_{0.16}Ni_{0.264}Cr_{0.013}O_{1.5\pm x}$, wherein x is $0.0 \leq x \leq 0.1$, . . . . The quantified reagents were wet-mixed, and then calcined in the air at 1200° C. for 2 hours. Then, Pt-13% Rh electrode wires 20 were inserted into the metal oxide body 10 of a temperature sensor device, and the metal oxide body 10 with a hexahedron structure having a size of 2.2×2.2×2 mm was press-molded. Then, the metal oxide body 10 was sintered in the air at 1400° C. for 1 hour and manufactured into a test piece.

Figure 3:
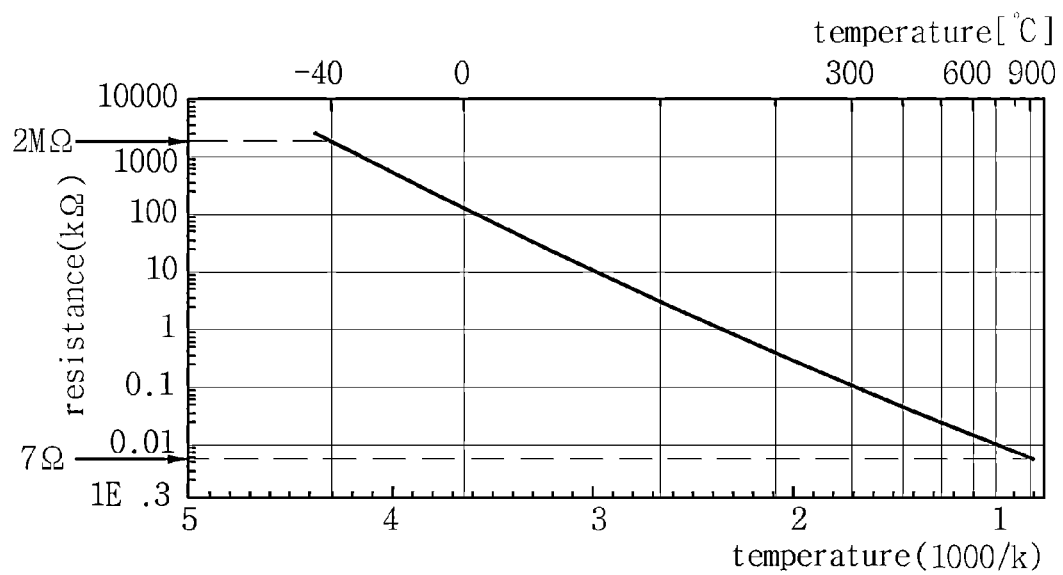
FIG. 3 is a temperature-resistance graph of the $Y_{0.2}Al_{0.1}Mn_{0.27}Fe_{0.16}Ni_{0.27}O_{1.5\pm x}$, composition, wherein x is 0.0≤x≤0.1, according to one exemplary embodiment of invention.

FIG. 3 is a temperature-resistance graph of the $Y_{0.2}Al_{0.1}Mn_{0.27}Fe_{0.16}Ni_{0.27}O_{1.5\pm x}$ composition, wherein x is $0.0 \leq x \leq 0.1$, according to one exemplary embodiment of the present invention.

At −40° C., the resistance was measured as about 2 MΩ, and at 900° C., the resistance was measured as about 7Ω. Then, the slope B was measured as 3636 K. The formula for calculating the slope B is $B=\ln(R_1/R_2)/(1/T_1-1/T_2)$, where $R_1$ represents a resistance value at absolute temperature $T_1$, and $R_2$ represents a resistance value at absolute temperature $T_2$.

Due to high linearity, with respect to a resistance of 2 MΩ at low temperature (−40° C.), and a resistance value of 10Ω at 600° C., it is possible to measure a temperature from −40° C. to 600° C. without additional amplification or correction.

Figure 4:
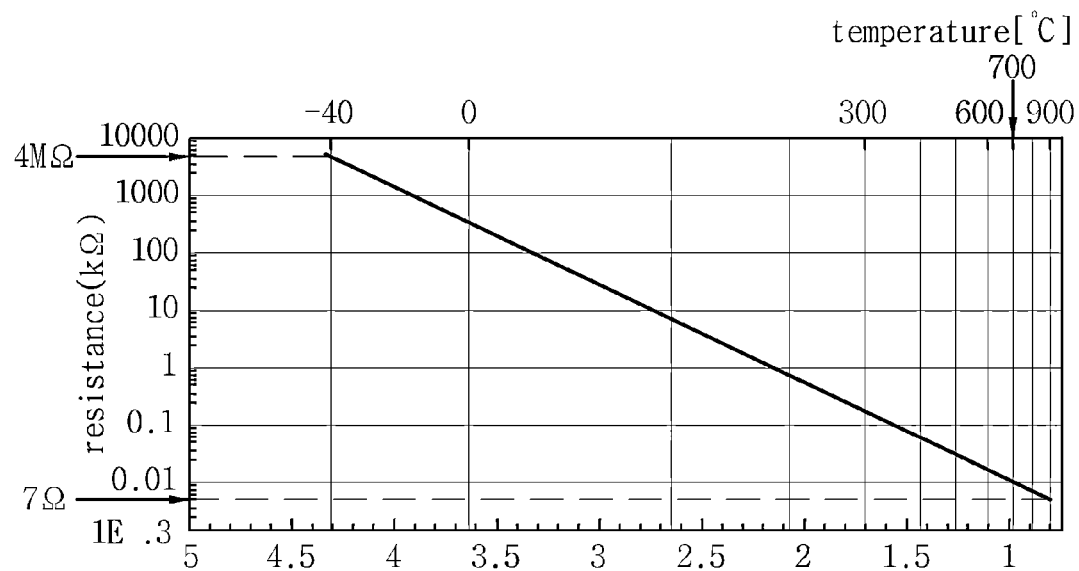
FIG. 4 is a temperature-resistance graph of the $Y_{0.2}Al_{0.1}Mn_{0.264}Fe_{0.16}Ni_{0.264}Cr_{0.013}O_{1.5\pm x}$, composition, wherein x is 0.0≤x≤0.1, according to an exemplary embodiment of the present invention.

FIG. 4 is a temperature-resistance graph of the $Y_{0.2}Al_{0.1}Mn_{0.264}Fe_{0.16}Ni_{0.264}Cr_{0.013}O_{1.5\pm x}$ composition, wherein x is $0.0 \leq x \leq 0.1$, according to another exemplary embodiment of the present invention.

At −40° C., the resistance was measured as about 4 MΩ, and at 900° C., the resistance was measured as about 7Ω. Then, the slope B was measured as 3876 K. The formula for calculating the slope B is $B=\ln(R_1/R_2)/(1/T_1-1/T_2)$, wherein $R_1$ represents a resistance value at absolute temperature $T_1$, and $R_2$ represents a resistance value at absolute temperature $T_2$.

Due to high linearity, with respect to a resistance of 4 MΩ at low temperature (−40° C.), and a resistance value of 10Ω at 700° C., it is possible to measure a temperature from −40° C. to 700° C. without additional amplification or correction.

In a macroscopic view, FIGS. 3 and 4 show similar graphs. Meanwhile, the slope in FIG. 4 ($Y_{0.2}Al_{0.1}Mn_{0.264}Fe_{0.16}Ni_{0.264}Cr_{0.013}O_{1.5\pm x}$, wherein x is $0.0 \leq x \leq 0.1$) is larger than that in FIG. 3. Furthermore, with respect to a resistance of 10Ω, the temperature range (−40° C. to 700° C.) in FIG. 4 is wider than that (−40° C. to 600° C.) in FIG. 3. Thus, it can be found that the addition of Cr in a small amount can increase the slope and the resistance.

Figure 5:
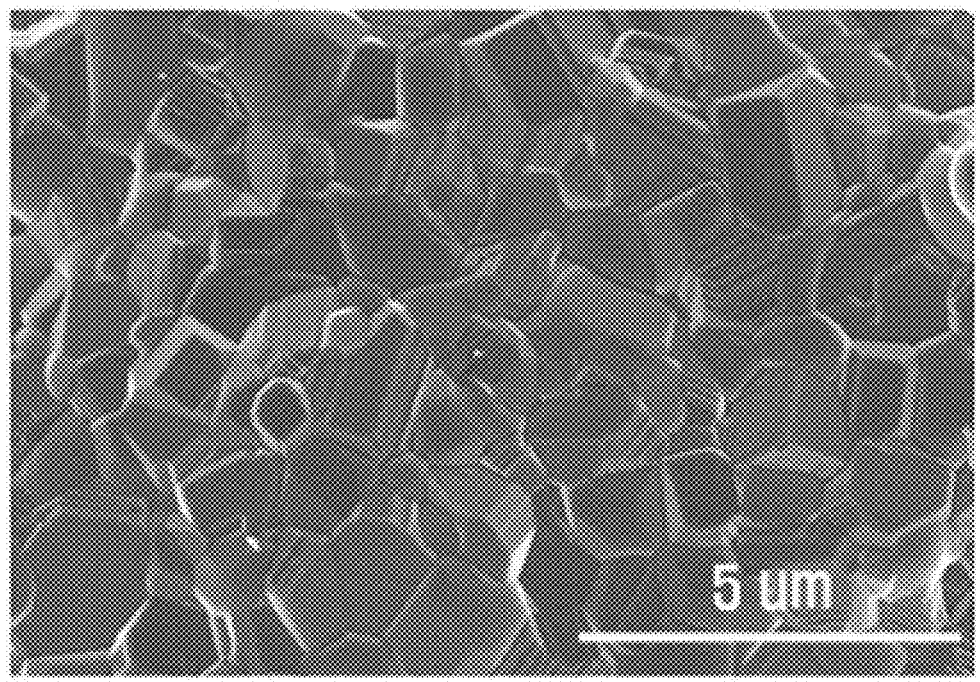
FIG. 5 is an electron microscopic photograph of a fracture of the $Y_{0.2}Al_{0.1}Mn_{0.27}Fe_{0.16}Ni_{0.27}O_{1.5\pm x}$, composition, wherein x is 0.0≤x≤0.1, according to one exemplary embodiment of invention.

FIG. 5 is an electron microscopic photograph of a fracture of a composition of $Y_{0.2}Al_{0.1}Mn_{0.27}Fe_{0.16}Ni_{0.27}O_{1.5\pm x}$, wherein x is $0.0 \leq x \leq 0.1$, according to one exemplary embodiment of the present invention. FIG. 5 shows that the particles of the composite material have a structure in which each face has a predetermined shape, each edge is linear, and two faces form a predetermined angle. In other words, each particle is formed in a typical crystalloid shape. However, there exist other particles with different shapes. Thus, 2 to 3 kinds of crystalloids are mixed. The particles have a size ranging from 1 μm to 3 μm, and are relatively uniformly distributed. Also, in the contact surface between particles, there is no amorphous (glassy) or unbonded material. Furthermore, there are very few pores. Thus, it is assumed that the metal oxide body 10 has a densification degree of 95% or more.

Figure 6:
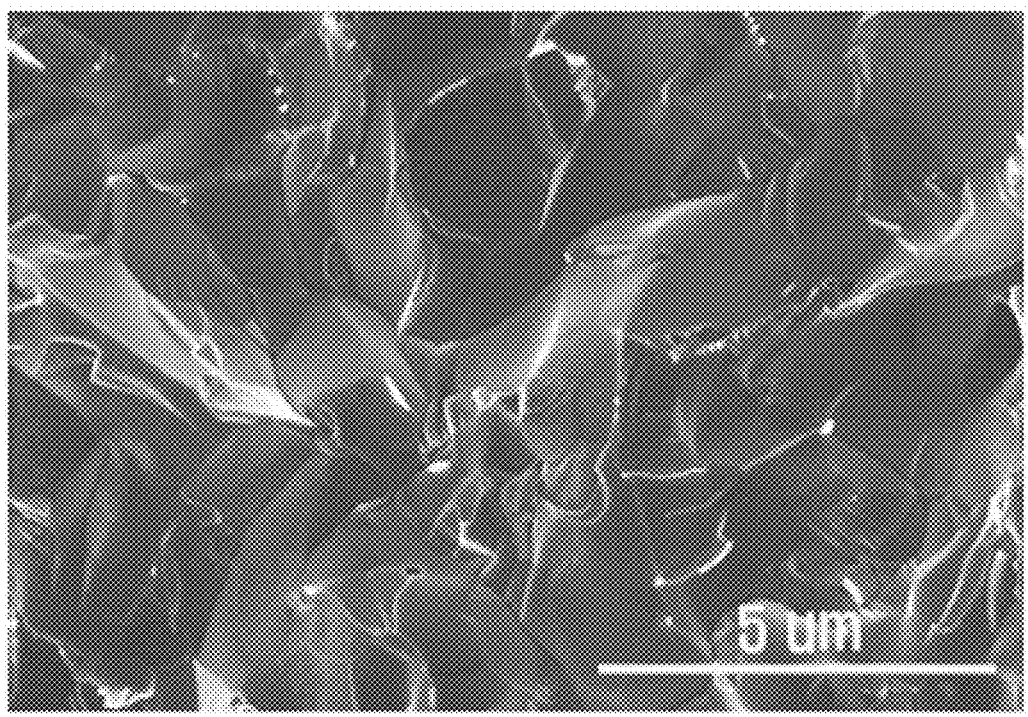
FIG. 6 is an electron microscopic photograph of a fracture of the $Y_{0.2}Al_{0.1}Mn_{0.264}Fe_{0.16}Ni_{0.264}Cr_{0.013}O_{1.5\pm x}$, composition, wherein x is 0.0≤x≤0.1, according to an exemplary embodiment of the present invention.

FIG. 6 is an electron microscopic photograph of a fracture of a composition of $Y_{0.2}Al_{0.1}Mn_{0.264}Fe_{0.16}Ni_{0.264}Cr_{0.013}O_{1.5\pm x}$, wherein x is $0.0 \leq x \leq 0.1$, according to an exemplary embodiment of the present invention. Relative to the composite material shown in FIG. 6, the particle structures are less clearly defined with respect to the shape, the edge, and the contact angle between faces. The particles have a relatively large maximum size of about 5 μm. Furthermore, there are very few pores. Thus, it is assumed that the sintered body has a densification degree of 95% or more.

According to the present invention, a composite material for a temperature sensor is obtained by mixing conventional transition metals with yttria and alumina in a predetermined amount, so that the resistance of the temperature sensor can be more easily adjusted according to a temperature change. Thus, a stability and a proper resistance range of a resistance value can be secured at high temperature. Also, according to the temperature change, the resistance value can be adjusted to be several MΩ at room temperature, and several tens of Ω at 500° C. to 600° C. Thus, there is an advantage in that it enables an easy measurement of a temperature change of a post-exhaust apparatus even at a high temperature.

Also, into the metal oxide body 10, the electrode wires 20 with a predetermined diameter are inserted, and the metal oxide body 10 is subjected to heat treatment at a high temperature. Thus, the molded metal oxide body is sintered while the electrode wires 20 re in tight contact with the molded metal oxide body, thereby tightly fixing them to the molded metal oxide body. This improves the durability of the temperature sensor device so that the temperature sensor device may have vibration and shock resistance. Also, this improves the reliability of the measured temperature value.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:
1. A temperature sensor, comprising:
a metal oxide body comprising a metal oxide of chemical formula $Mn_\alpha Fe_\beta Ni_\gamma Cr_\delta Y_\epsilon Al_\varphi$, wherein α ranges from 0.1 to 0.4 mole, β ranges from 0.1 to 0.3 mole, γ ranges from 0.1 to 0.5 mole, δ ranges from 0.01 to 0.05 mole, ε ranges from 0.1 to 0.5 mole, and Φ ranges from 0.01 to 0.2 mole);

a first electrode wire having a first end and a second end; and a second electrode wire having a first end and a second end;

wherein, the first end of each wire is inserted into the metal oxide body to a depth proximate to an exterior surface of the metal oxide body, and the first electrode wire is parallel to, and spaced apart from, the second electrode wire.

2. The temperature sensor of claim 1, wherein the metal oxide body has a size of 2.2 mm×2.2 mm×2.0 mm.

3. The temperature sensor of claim 1, wherein the first and second electrode wires comprise Pt.

4. The temperature sensor of claim 1, wherein the first and second electrode wires comprise Pt—Rh.

5. The temperature sensor of claim 1, wherein the first and second electrode wires have a diameter of about 0.3 mm, are spaced apart by a distance of about 0.6 mm, and inserted into the metal oxide body so that the first end of each wire is bout 0.5 mm from the exterior surface of the metal oxide body.

6. A method for manufacturing a temperature sensor, comprising:

obtaining a metal oxide of the chemical formula $Mn_\alpha Fe_\beta Ni_\gamma Cr_\delta Y_\epsilon Al_\Phi$, wherein α ranges from 0.1 to 0.4 mole, β ranges from 0.1 to 0.3 mole, γ ranges from 0.1 to 0.5 mole, δ ranges from 0.01 to 0.05 mole, ε ranges from 0.1 to 0.5 mole, and Φ ranges from 0.01 to 0.2 mole);

calcining the mixed metal oxides;

inserting a first electrode wire and a second electrode wire into the calcined metal oxides;

press-molding the metal oxides to form a metal oxide body; and performing a heat treatment on the press-molded metal oxides, thereby forming the temperature sensor.

7. The method of claim 6, wherein the step of calcining is performed in the air at a temperature of 1000° C. to 1400° C. for a time of 0.5 to 5 hours, thereby forming the metal oxides into a stable shape.

8. The method of claim 6, wherein press-molding further comprises:

inserting the first and second electrode wires into the metal oxides in an insertion direction, wherein the first and second electrode wires are substantially parallel to one another, and are inserted to a substantially equal depth; and adding pressure in a direction parallel to the insertion direction of the electrode wires.

9. The method of claim 6, wherein the heat treatment is performed at a range of 1300° C. to 1500° C. for 0.5 to 5 hours, thereby creating a tight contact with the first and second electrode wires.

10. The method of claim 6, wherein the metal oxide is obtained by performing calcination and succeeding heat treatment on metals selected from the group consisting of Mn, Fe, Ni, Cr, Y, Al, and any mixture thereof.

11. The method of claim 6, wherein the metal oxide is obtained by mixing $Y_2O_3$ and $Al_2O_3$ with $MnO_2$, $Fe_2O_3$, NiO, and $Cr_2O_3$.

12. The method of claim 11, wherein the metal oxide has a composition of $Y_{0.2}Al_{0.1}Mn_{0.27}Fe_{0.16}Ni_{0.27}O_{1.5}$.

13. The method of claim 11, wherein the metal oxide has a composition ratio of $Y_{0.2}Al_{0.1}Mn_{0.264}Fe_{0.16}Ni_{0.264}Cr_{0.013}O_{1.5}$.

14. The method of claim 6, wherein the first and second electrode wires are made of pure Pt or an alloy of Pt—Rh.

15. The method of claim 14, wherein the first and second electrode wires have a diameter of about 0.3 mm.

* * * * *